United States Patent
Baldassarre et al.

(10) Patent No.: US 11,314,576 B2
(45) Date of Patent: Apr. 26, 2022

(54) SYSTEM AND METHOD FOR AUTOMATING FAULT DETECTION IN MULTI-TENANT ENVIRONMENTS

(71) Applicant: Accenture Global Solutions Limited, Dublin (IE)

(72) Inventors: Emanuele Baldassarre, Bari (IT); Luigi Lucca, Rome (IT); Rino Guglietta, Fondi (IT); Jagaran Das, Durgapur (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/998,557

(22) Filed: Aug. 20, 2020

(65) Prior Publication Data

US 2021/0303381 A1    Sep. 30, 2021

(30) Foreign Application Priority Data

Mar. 31, 2020 (IN) ............... 20204101258

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0751* (2013.01);
(Continued)

(58) Field of Classification Search
CPC ............... G06F 11/079; G06F 11/0709; G06F 11/0793; G06F 11/0751; G06N 20/00; G06N 5/04
See application file for complete search history.

(56) References Cited

U.S. PATENT DOCUMENTS 9,384,082 B1   7/2016  Lee et al.
10,282,248 B1  5/2019  Gudka et al.
(Continued)

FOREIGN PATENT DOCUMENTS

EP    3312725 A2     4/2018
WO    2016/191639 A1  12/2016

OTHER PUBLICATIONS

Extended European Search Report dated Feb. 16, 2021 for European Patent Application No. 20192021.2.

*Primary Examiner* — Jonathan D Gibson
(74) *Attorney, Agent, or Firm* — Plumsea Law Group, LLC

(57) ABSTRACT

A system and method of automating fault prediction and remediation for a multi-tenant system is disclosed. The system and method offer an intelligent augmentation of a multi-tenant system by automating the harvesting and processing of raw data logs generated by the various aspects of the platform as well as the implementation of an appropriate response. In some embodiments, the proposed system includes a hybrid model that can be configured to offer both assisted and unassisted errors. The incorporation of a dynamic learning algorithm minimizes operation errors for any set of computing units. Potential system faults can be detected with little to no human intervention and allow for an unattended platform that collects performance data across the system from a wide range of sources to provide centralized and automated fault prediction, as well as expedited automated resolutions to such faults that depend on little to no human intervention.

20 Claims, 12 Drawing Sheets

(51) Int. Cl.
*G06N 20/00* (2019.01)
*G06N 5/04* (2006.01)

(52) U.S. Cl.
CPC .......... *G06F 11/0793* (2013.01); *G06N 5/04* (2013.01); *G06N 20/00* (2019.01)

(56) References Cited

U.S. PATENT DOCUMENTS

| | | | |
|---|---|---|---|
| 2017/0091008 A1* | 3/2017 | Cherbakov | G06F 11/079 |
| 2017/0220407 A1 | 8/2017 | Estrada et al. | |
| 2018/0260268 A1* | 9/2018 | Madsen | G06F 11/079 |
| 2019/0095265 A1* | 3/2019 | Dome | H04L 41/147 |
| 2020/0151042 A1* | 5/2020 | Spencer | G06N 20/00 |
| 2020/0226401 A1* | 7/2020 | Rajagopal | G06N 7/005 |
| 2021/0026722 A1* | 1/2021 | Bhatia | G06N 3/088 |
| 2021/0174941 A1* | 6/2021 | Mathur | G06F 11/3664 |
| 2021/0303381 A1* | 9/2021 | Baldassarre | G06F 11/079 |
| 2021/0342212 A1* | 11/2021 | Neumann | G16H 50/20 |
| 2021/0390011 A1* | 12/2021 | Oser | G06F 11/3684 |

* cited by examiner

| FIELD NAME | DESCRIPTION | TYPE | NOTES |
|---|---|---|---|
| ISO8601 DATETIME WITH TIMEZONE INDICATION | CONTAINS THE DATE IN WHICH THE LOG ENTRY HAS BEEN CREATED. FORMAT: YYYY-MM DDTHH:MM:SS.SSSZ | DATETIME | COMPONENT-GENERATED |
| LOG LEVEL | FIXED STRING: INFO | STRING | ENABLER PROPERTY |
| LOG TYPE | FIXED STRING: METERING | STRING | ENABLER PROPERTY |
| CPAAS-TENANT-ID | CONTAINS THE CRSM TENANT ID ASSOCIATED TO THE USER THAT IS INVOKING THE API | INTEGER | HTTP HEADER |
| CPAAS-TRANSACTION-ID | CONTAINS THE TRANSACTION ID GENERATED BY THE INVOKER OF THE SERVICE | UUID | HTTP HEADER |
| CPAAS-PLATFORM-TRANSACTION-ID | CONTAINS THE TRANSACTION ID GENERATED BY THE CPAAS PLATFORM | UUID | HTTP HEADER |
| COMPONENTNAME | THE NAME OF THE BE COMPONENT THAT IS PROCESSING THE SERVICE REQUEST | STRING | ENABLER PROPERTY |

| FIELD NAME | DESCRIPTION | TYPE | NOTES |
|---|---|---|---|
| SERVICENAME | THE NAME OF THE BE SERVICE INVOKED. FOR RULE ENGINE IN CASE OF SERVICE REQUEST INITIATED BY ACTION, THIS FIELD MUST BE SET WITH THE NAME OF THE ACTION | STRING | ENABLER PROPERTY |
| SERVICECATEGORY | CATEGORY TO WHICH THE REQUESTED SERVICE BELONGS | STRING | ENABLER PROPERTY |
| CPAAS-PARENT-BUSINESS-USER-ID | CONTAINS THE CRSM USER'S PARENT BUSINESS USER ID THAT IS INVOKING THE API | UUID | HTTP HEADER |
| CPAAS-USER-ROLES | CONTAINS THE LIST OF ROLES (MEMBER OF) ASSIGNED TO THE USER IDENTIFIED BY THE HEADER CPAAS-USER-ID | STRING | HTTP HEADER |
| CPAAS-VISIBILITY-GRANT-ID | CONTAINS THE ID OF THE VISIBILITY GRANT TO BE APPLIED ON BE FOR THE USER REQUESTING THE SERVICE (IDENTIFIED BY THE HEADER CPAAS-USER-ID) | INTEGER | HTTP HEADER |

| FIELD NAME | DESCRIPTION | TYPE | NOTES |
|---|---|---|---|
| INITIATORENTITYID | THE IDENTIFIER OF THE USER OR DEVICE THAT HAS INITIATED THE SERVICE REQUEST. IT CAN BE UUID OF THE USER DEVICEID#DEVICETYPE (ONLY IN CASE OF DEVICE) | UUID | HTTP HEADER |
| CPAAS-CLIENT-TYPE | THE TYPE OF ENTITY THAT HAS INITIATED THE SERVICE REQUEST FOLLOWING THE FOLLOWING ACCEPTED VALUES:<br>• WEB<br>• MOBILE<br>• DEVICE<br>• SERVER<br>• ACTION (FOR RULE ENGINE IN CASE OF FLOW INITIATED BY ACTION) | STRING | HTTP HEADER |
| HTTPRESPONSECODE | THE HTTP RESPONSE CODE RETURNED BY THE REQUESTED SERVICE | INTEGER | BE RESPONSE |
| APPLICATIVEERRORCODE | THE APPLICATIVE ERROR CODE RETURNED BY THE REQUESTED SERVICE | STRING | BE RESPONSE |

| FIELD NAME | DESCRIPTION | TYPE | NOTES |
|---|---|---|---|
| ServiceResponseDescription | DESCRIPTION OF THE REQUESTED SERVICE'S OUTCOME | STRING | BE RESPONSE |
| RequestStartDate | THE TIME STAMP OF THE RECEIVED REQUEST. IT IS ISO8601 DATETIME WITH TIMEZONE INDICATION | DATETIME | BE RESPONSE |
| ResponseEndDate | THE TIME STAMP OF THE RETURNED RESPONSE. ISO8601 DATETIME WITH TIMEZONE INDICATION | DATETIME | BE RESPONSE |
| RequestDurationInMsec | THE DURATION OF THE SERVICE REQUEST'S PROCESS | INTEGER | BE RESPONSE |
| CPAAS-USER-EMAIL | CONTAINS THE EMAIL OF THE USER REQUESTING THE SERVICE | EMAIL (STRING) | BE RESPONSE |
| CORRELATION-ID | CONTAINS THE CORRELATION ID. IT CAN BE GENERATED EITHER BY AN EXTERNAL OR INTERNAL COMPONENT AND USED TO COLLECT DIFFERENT OPERATION LINKED TO THE SAME E2E TRANSACTION | STRING | BE RESPONSE |

SYSTEM AND METHOD FOR AUTOMATING FAULT DETECTION IN MULTI-TENANT ENVIRONMENTS

CROSS-REFERENCE TO RELATED APPLICATION(S)

This application claims the benefit of Indian Provisional Patent Application No. 202041014258, filed Mar. 31, 2020, which is hereby incorporated by reference in its entirety. European Patent Application No. EP20192021.2, filed on Aug. 20, 2020, also claims priority to Indian Provisional Patent Application No. 202041014258, and is hereby incorporated by reference in its entirety.

TECHNICAL FIELD

The present disclosure generally relates to the automation of multi-tenant architecture type environments. More specifically, the present disclosure generally relates to a system and method for intelligently augmenting the processing and operations associated with platforms and systems configured as multi-tenant architecture environments.

BACKGROUND

Software multi-tenancy may include a software architecture in which a single instance of software runs on a server and serves multiple tenants. A tenant may refer to a group of users that share a common access with specific privileges to the software instance. In a multi-tenant architecture, a software application may be designed to provide every tenant with a dedicated share of the instance, including data, a configuration, user management, functional properties, and/or non-functional properties. Multi-tenancy may be contrasted with a multi-instance architecture, where separate software instances operate on behalf of different tenants. A cloud computing environment may implement a multi-tenant architecture or a multi-instance architecture.

Multi-tenant architecture has a number of advantages, including lower costs for the consumer, the availability of pay-for-what-you-need pricing models, the convenience of host-provided updates, fewer hardware concerns for the end-user, more efficient resource usage, as well as an easily scalable architecture that can be customized to the changing size and structure of an organization. However, multi-tenant architecture has also remained heavily reliant on service hosts having sufficient human resources to address errors and other failures in the system. The ability to more efficiently and effectively predict, manage, and resolve errors with minimal human intervention would greatly enhance the productivity of such platforms.

There is a need in the art for a system and method that addresses the shortcomings discussed above.

SUMMARY

A system and method for automated fault prediction and remediation of a multi-tenant system is disclosed. The system and method solve the problems discussed above by providing a comprehensive, unified system of intelligence which can augment multi-tenant platform operations, allowing the platform to operate with little to no human intervention. The automated architecture applies dynamic learning algorithms configured to minimize operation errors for any set of computing units. In addition, in some embodiments, the system and method can be implemented as either a fully automated (unassisted) or a semi-automated (assisted) process. The proposed system and method are also configured for ready incorporation by across a wide variety of multi-tenant software stacks.

In one aspect, the disclosure provides a method of automating some or all aspects of fault prediction and remediation for multi-tenant systems. The method includes automatically collecting log data for one or more components of the multi-tenant system over a first period of time, and automatically analyzing, via an artificial intelligence engine, the collected log data to identify specific events that have occurred during the first period of time. The method also includes automatically calculating, based on the collected log data, a plurality of performance metrics, and automatically correlating, via a complex event processor, each event with a performance metric to identify potential fault occurrence patterns. The method further includes automatically identifying a plurality of corrective actions recommended for execution in order to address each of the potential fault occurrence patterns.

In another aspect, the disclosure provides a system for automating some or all aspects of fault prediction and remediation for multi-tenant systems. The system includes a processor and machine-readable media including instructions which, when executed by the processor, cause the processor to automatically collect log data for one or more components of the multi-tenant system over a first period of time, as well as automatically analyze, via an artificial intelligence engine, the collected log data to identify specific events that have occurred during the first period of time. The instructions further cause the processor to automatically calculate, based on the collected log data, a plurality of performance metrics, and automatically correlate, via a complex event processor, each event with a performance metric to identify potential fault occurrence patterns. Furthermore, the instructions cause the processor to automatically identify a plurality of corrective actions recommended for execution in order to address each of the potential fault occurrence patterns.

In another aspect, the disclosure provides a system that includes one or more computers and one or more storage devices storing instructions that are operable, when executed by the one or more computers, to cause the one or more computers to automatically collect log data for one or more components of the multi-tenant system over a first period of time, and to automatically analyze, via an artificial intelligence engine, the collected log data to identify specific events that have occurred during the first period of time. The instructions also cause the one or more computers to automatically calculate, based on the collected log data, a plurality of performance metrics, and automatically correlate, via a complex event processor, each event with a performance metric to identify potential fault occurrence patterns. In addition, the instructions cause the one or more computers to automatically identify a plurality of corrective actions recommended for execution in order to address each of the potential fault occurrence patterns.

In some embodiments, the disclosed systems and methods may include an artificial intelligence (AI) engine (e.g., such as may be based on TensorFlow) that can analyze the logs to identify specific events, and a model applied to calculate the mean time to potential failure.

In some embodiments, the performance metrics used by the disclosed systems and methods may include, for example, a mean time to failure (MTTF) that may be used to predict future changes to the health or performance of the hardware components (e.g., by predicting a future value of a health metric or performance metric) or software components. In one example, the plurality of performance metrics includes a first performance metric corresponding to a Mean Time To Failure (MTTF) value, while in another example, the plurality of performance metrics includes a first performance metric corresponding to a Mean Time Between Failure (MTBF) value. In some embodiments, additional performance metrics may also be computed, such as a mean time between failures (MTBF) that defines an average amount of time between consecutive determinations that a problem exists on the target system based on received performance information, mean time to closure (MTTC) that defines an average amount of time required for a development team to turn a new feature request from a customer into working software changes deployed to the target system, a mean time to repair (MTTR) that corresponds to an average amount of time required to resolve a problem associated with a diagnostic event, and a mean time to detect (MTTD) that defines an average amount of time associated with determination of a root cause associated with a diagnostic event.

In some embodiments, the disclosed systems and methods may include a complex event processor correlates the events and mean times and automatically identifies solutions, which can be executed automatically or pending approval by an operations team.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 8A-8D are a set of tables presenting examples of log data structures used by the artificial intelligence engine to verify system availability and predict faults, according to an embodiment.

DESCRIPTION OF EMBODIMENTS

Figure 1:
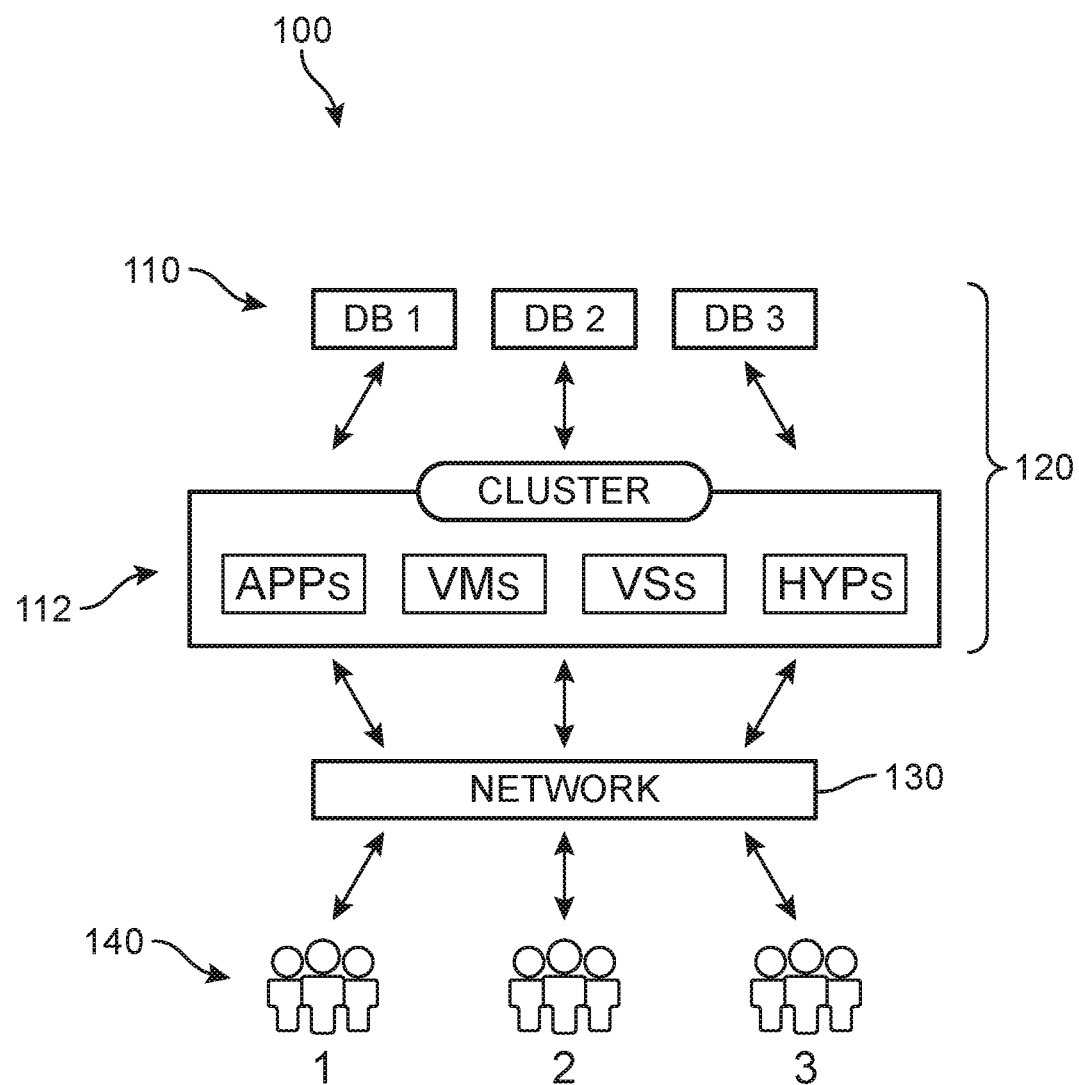
FIG. 1 is a schematic diagram of an embodiment of a multi-tenant system.

Software systems may be subject to partial failure, violations of an established service-level agreement (SLA), or unexpected responses to workloads. The process of recovering from such failures, violations, or unexpected responses can include, for example, rebooting a system, or further expert analysis if rebooting is insufficient. For example, in order to determine the cause of a failure or other error in a multi-tenant environment, an expert may need to manually evaluate a series of events to track down the cause of the failure. Once the cause of the failure is detected, a recovery mechanism may be manually applied to correct the failure. These processes can be time-consuming and complex, for example, based on the complexities of the software, the cause of the failure, the responsiveness of the repair team, and the complexities of the recovery mechanism.

The proposed systems and methods describe an intelligent augmentation of such multi-tenant platforms by automating the harvesting and processing of raw data logs generated by the various aspects of the platform as well as the implementation of an appropriate response. In some embodiments, the proposed system includes a hybrid model that can be configured to offer both assisted and unassisted errors. For example, an error details extractor may fetch details from log files and/or from a Logstash-type tool that records log data from one or more devices and reports it to a database (e.g., ElasticSearch). An artificial intelligence (AI) engine (e.g., such as may be based on TensorFlow) can analyze the logs to identify specific events, and a model applied to calculate the mean time to potential failure. A complex event processor correlates the events and mean times and automatically identifies solutions, which can be executed automatically or pending approval by an operations team. The incorporation of a dynamic learning algorithm minimizes operation errors for any set of computing units. Potential system faults can be detected with little to no human intervention and allow for an unattended platform that collects performance data across the system from a wide range of sources to provide centralized and automated fault prediction, as well as expedited automated resolutions to such faults that will depend on little to no human intervention. This type of architecture is flexible, and readily able to fit into software stack of a variety of configurations.

As will be discussed in detail below, aspects of the proposed systems and methods may be incorporated in a multi-tenant software architecture. A multi-tenant-based system allows users or customer organizations (i.e., "tenants") to share database resources that are organized as one logical database on one or more central server computer(s). This is in contrast to single-instance architecture in which tenants maintain their own locally hosted databases and application programs. In multi-tenant architecture, the centralized database tables themselves can be shared and logical structures are employed to ensure differentiation and security among the different tenants. Furthermore, the shared application programs can be segregated through access control mechanisms that restrict access and usage to only authorized users or subscribers. For purposes of the current description, the terms "organization," "client," "organization resources," or "client resources" refer to database resources (i.e., data, metadata, programs, and other resources) that are maintained in a central multi-tenant database for access by users who have appropriate access privileges. Such resources will generally be managed by a server and data storage system maintained by a platform provider, as opposed to computers within the actual client (tenant) businesses themselves. In addition, a Cloud Service Provider (CSP) may include an organization that provides a cloud computing resource to a client device and/or a user of a client device. Furthermore, the term "component" refers to software applications and other system modules and features comprising or supporting the multi-tenant architecture.

The disclosed systems and methods are configured to optimize environments in which a multi-tenant system might be used. Referring to FIG. 1, for purposes of introduction, an example of a multi-tenant environment ("environment") 100 is depicted. Environment 100 includes a set of user systems 140 (e.g., shown as client device groups 1 through 3), where the user systems 140 are multi-tenants of cloud computing resources 120 (here shown as a resource cluster 112, labeled APPs, VMs, VSs, and HYPs) and databases 110. While environment 100 shows three client devices, four resources, and three databases for ease of explanation, there can be hundreds, thousands, etc. of client devices, resources, databases, or other computer resources associated with zero or more organizations. Devices of environment 100 may interconnect via wired connections, wireless connections, or a combination of wired and wireless connections.

The set of user systems 140 may utilize the set of cloud computing resources 120 (e.g., memory, bandwidth, random-access memory (RAM), processor, software, etc.) over a network 130 to perform various operations, such as database queries, application program interface (API) calls, computational tasks, and/or the like. A cloud computing environment may provide a static cloud computing resource (e.g., referred to herein as a static cloud computing resource). For example, a static cloud computing resource may include a cloud computing resource that is static in nature and where the amount of the cloud computing resource available to a client device is not based on, or determined with regard to, a runtime request for the cloud computing resource or an operation that uses the cloud computing resource. As a particular example, a static cloud computing resource may include cloud-based storage resources or bandwidth available to a client device. Additionally, or alternatively, a cloud computing environment may provide a dynamic cloud computing resource (e.g., referred to herein as a dynamic cloud computing resource or a runtime cloud computing resource). For example, a dynamic cloud computing resource may be dynamic in nature where an amount of the cloud computing resource available to a client device depends on a runtime request for the cloud computing resource or an operation that uses the cloud computing resource. As a specific example, a dynamic cloud computing resource may include random access memory (RAM) provided to a client device. Static cloud computing resources and dynamic cloud computing resources may be associated with thresholds (e.g., static thresholds and dynamic thresholds, respectively).

As a general matter, a user system refers to one or more devices capable of receiving, generating, storing, processing, and/or providing information associated with analyzing data related to resource utilization of a cloud computing resource in a cloud computing environment. For example, user systems 140 may include a desktop computer, a mobile phone (e.g., a smart phone or a radiotelephone), a laptop computer, a tablet computer, a gaming device, a wearable communication device (e.g., a smart wristwatch or a pair of smart eyeglasses), or a similar type of device. A user system can run an HTTP client, e.g., an internet browsing program, allowing a user (e.g., subscriber of the multi-tenant database system) of user systems 140 to access, process and view information, pages and applications available to it from over network 130. Each user system also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms, applications and other information provided by cloud computing resources 120 or other systems or servers.

Furthermore, the cloud computing resources 120 may include compute instances executing in databases 110, storage devices, data transfer devices, etc. In some implementations, cloud computing resources 120 may communicate with other computing resources via wired connections, wireless connections, or a combination of wired and wireless connections. In some embodiments, cloud computing resources 120 may include a group of cloud resources, such as one or more applications ("APPs"), one or more virtual machines ("VMs"), one or more virtualized storages ("VSs"), or one or more hypervisors ("HYPs"), as shown in FIG. 1.

Applications can include one or more software applications that may be provided to or accessed by one or more devices of environment 100. Applications may eliminate a need to install and execute the software applications on devices of environment 100. For example, an application may include software capable of being provided via a cloud computing environment. In some implementations, one application may send/receive information to/from one or more other applications, for example, via a virtual machine. As a general matter, a virtual machine includes a software implementation of a machine (e.g., a computer) that executes programs like a physical machine. A virtual machine may be either a system virtual machine or a process virtual machine, depending upon use and degree of correspondence to any real machine by a virtual machine. A system virtual machine may provide a complete system platform that supports execution of a complete operating system ("OS"). A process virtual machine may execute a single program, and may support a single process. In some implementations, virtual machine may execute on behalf of a user (e.g., a user of client-end devices), and may manage infrastructure of cloud computing environment, such as data management, synchronization, or long-duration data transfers.

In addition, virtualized storage includes one or more storage systems and/or one or more devices that use virtualization techniques within the storage systems or devices of cloud computing resources 120. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Finally, a hypervisor provides hardware virtualization techniques that allow multiple operating systems (e.g., "guest operating systems") to execute concurrently on a host computer, such as computing resource. Hypervisor may present a virtual operating platform to the guest operating systems, and may manage the execution of the guest operating systems. Multiple instances of a variety of operating systems may share virtualized hardware resources.

The network 130 includes one or more wired and/or wireless networks. For example, network 130 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks. The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1.

In such a manner, users of user systems 140 might interact with a multi-tenant database system (MTS). The users might be users in differing capacities, and the capacity of a particular client-end device might be entirely determined by permissions (permission levels) for the current user. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

In some embodiments, the environment 100 shown in FIG. 1 depicts a web-based client management system. For example, application servers can be configured to implement and execute client management software applications as well as provide related data, code, forms, Web pages and other information to and from user systems 140 and to store to, and retrieve from, a database system related data, objects and Web page content. With a multi-tenant system, data for multiple tenants may be stored in the same physical database object; however, tenant data typically is arranged so that data of one tenant is kept logically separate from that of other tenants so that one tenant does not have access to another tenant's data, unless such data is expressly shared.

Figure 2:
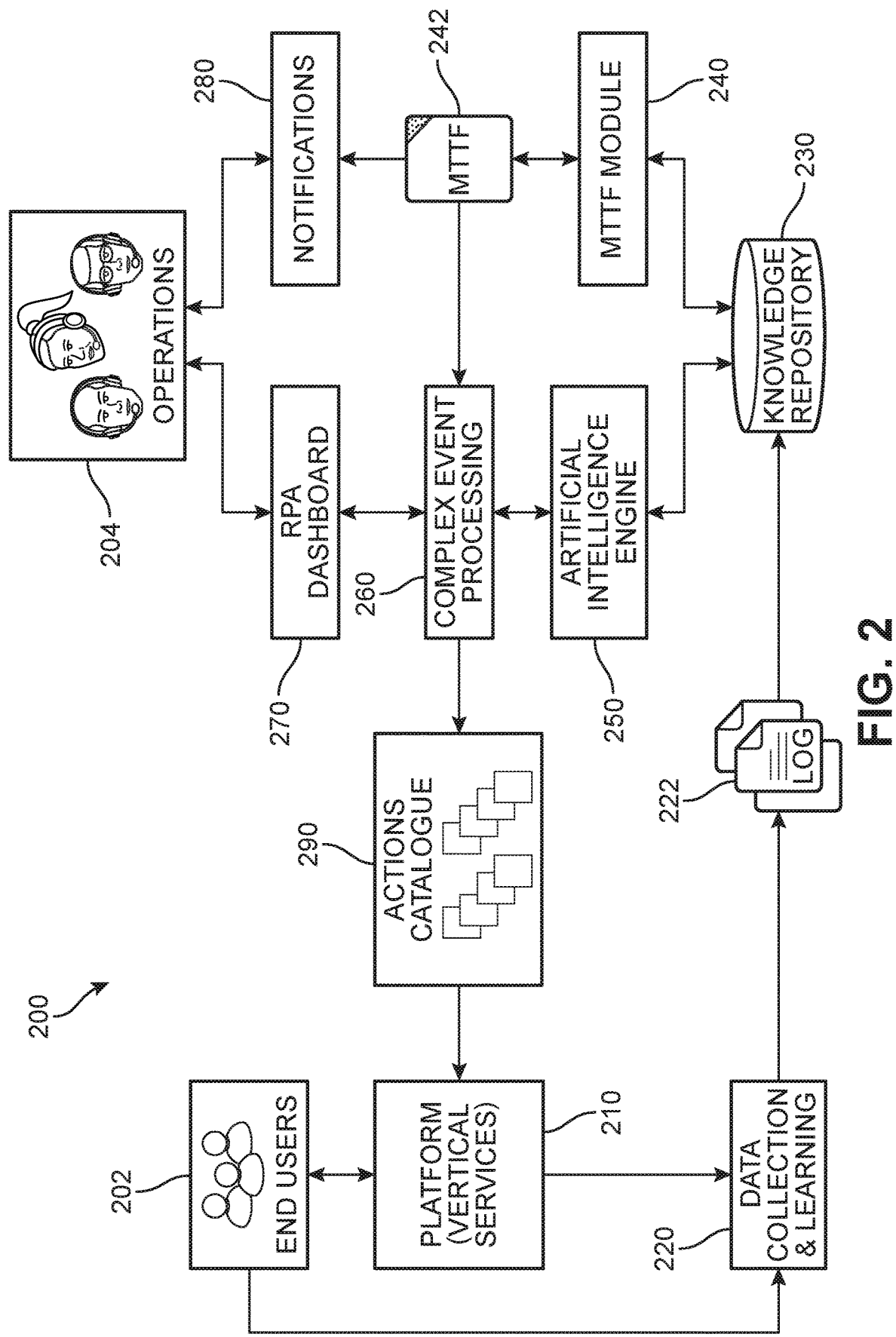
FIG. 2 is a schematic diagram of an embodiment of an architecture of an automated fault detection and remediation system.

Referring now to FIG. 2, one embodiment of an intelligent multitenant architecture 200 for fault detection and remediation is presented. Architecture 200 can include a plurality of interconnected components that serve a multi-tenant system 210 that can include a platform 210 configured to provide vertical services to tenants. The vertical services refer to the applications or services hosted by the platform 210, and typically refer a service that provides information or solutions specialized in a certain category. The vertical services may define, view, and/or manage rules for dispatching sampling data sent from the devices associated with end-user devices ("devices") 202 based on the rules associated with them. As some non-limiting examples, vertical services may include business and office solutions, vehicle tracking, remote healthcare diagnostics, remote metering, IP surveillance, personal security, or any other services service providers may implement. The platform 210 is configured to provide the capabilities needed to rapidly create, deliver and manage new vertical solutions and services. In different embodiments, a platform can enable functionalities including but not limited to device/system monitoring (discussed in greater detail below), device/system management, data capture, and/or data management or accounting.

In general, device/system management refers to a set of technologies, protocols and standards used to allow the remote management of devices of end-users 202. The device management functionality can be used to update device firmware or operating systems, install applications, or fix bugs, using a wired or wireless interface to the platform 210. The device management functionality allows the configuration of devices, including, as examples, configuring the devices for first time use, enabling features of the device, and disabling the features. The device management functionality also allows changes to be made to settings and parameters of the devices, provide for new software and/or bug fixes to be loaded on the devices, and provide firmware upgrades and lifecycle management of the devices. The device management functionality may be provided via a web portal or web service interfaces that allow third parties to perform device management operations.

Furthermore, in some embodiments, the platform 210 can provide data capture functionality by providing functions to take data received from devices 202 and dispatching the data to third party service providers or processing components of the platform 210, or to store the data in a data repository. In addition, components of the platform 210 may trace usages of various types to support the accounting functionality. The accounting functionality may be provided by a flow business process manager in some cases. In some embodiments, the accounting functionality may also be provided by integrating with a third-party accounting system.

The architecture 200 described herein further offers an augmented, intelligent system monitoring functionality configured to automate device diagnostics and fault management functions. Diagnostics and fault management can be understood to refer to hardware issues, as well as other elements such as application modules. The system diagnostics component of the system monitoring functionality is able to analyze log files, the presence of the devices on the network and the data regarding the status of the devices. The fault management component evaluates predetermined rules and performs actions according to the rules.

In FIG. 2, a data collection and learning module ("learning module") 220 is illustrated which is configured to automatically collect, process, and forward events and log messages from various components and aspects of devices 202 and platform 210 for different periods of time, for example over a few seconds, minute, hour, day, or other period. The data will be timestamped and can be compared to previous or subsequently collected data occurring at the same time of day. This collection can occur using tools such as, for example, Logstash, Fluentd, Splunk, Kafka, Beats, Graylog, Filebeat, rsyslog, syslog-ng, and Logagent. In some embodiments, the architecture 200 executes the learning module 220 to ingest and retrieve network data from multiple sources. The ingestion process begins on the client side where, for example, an instance of Logstash executes to record and securely transmit event data, via SSL, to a Logstash instance. The learning module 220 may convert the network data to a specific file format, such as common event format (CEF) or comma separated values (CSV) format. In some embodiments, the learning module 220 may also enhance the network data with additional context by executing an operational analytics process. Once the network data has been prepared, the learning module 220 sends the processed network data (e.g., logs and events data 222) to potentially multiple destinations.

Logs and events data 222 is received and stored in a knowledge store or repository 230. The repository 230 can for example utilize and search and analytics engine such as ElasticSearch, Solr, Lucene, MongoDB, Algolia, and Splunk, or other search and analytics engines, as well as batch analytics engines, data formatting, searching, analysis and visualization processors, data libraries, and cloud storage for data archival. Repository 230 can be configured to analyze past data in ElasticSearch, for example, and predict future utilization and/or generate recommendations related to capacity planning on cloud vendors. The repository 230 can also provide insights to users on their resource utilization behavior.

In addition, the architecture 200 includes an artificial intelligence engine 250, which may implement an artificial intelligence service that will be trained to detect any anomaly in the logs and events data. An example artificial intelligence service includes TensorFlow provided by Google, Inc. of Mountain View, Calif. In some examples, TensorFlow can be described as an open source software library for numerical computation using data flow graphs. However, other deep learning application programming interfaces (API) that implement a known machine learning or deep learning technique may also be used, such as but not limited to GraphDB, MLpack, Darknet, CatBoost, Training Mule, Cloud AutoML, Theano, Keras, Torch, Infer.NET, SciKit Learn, Apache Spark MLlib, etc.

The repository 230 also shares data with modules configured to track diagnostic events along with activities undertaken to resolve any issues that triggered the diagnostic event to determine key performance metrics. For example, a key performance metric may include a mean time to failure (MTTF) that may be used to predict future changes to the health or performance of the hardware components (e.g., by predicting a future value of a health metric or performance metric) or software components. The predicted metrics may be compared to predefined thresholds such as manufacture specifications or service level agreement (SLA) requirements (e.g., quality of service requirements, service level objectives, or other requirements). The point in time when the predicted metric and the predefined thresholds intersect represents predicted component failure, and the distance to this time is the mean time to failure (MTTF), or mean time to fault. This metric 242 may be generated by a MTTF module 240. In other embodiments, additional performance metrics may also be computed by other modules (not shown in FIG. 2), such as a mean time between failures (MTBF) that defines an average amount of time between consecutive determinations that a problem exists on the target system based on received performance information, mean time to closure (MTTC) that defines an average amount of time required for a development team to turn a new feature request from a customer into working software changes deployed to the target system, a mean time to repair (MTTR) that corresponds to an average amount of time required to resolve a problem associated with a diagnostic event, and a mean time to detect (MTTD) that defines an average amount of time associated with determination of a root cause associated with a diagnostic event.

In addition, a complex event processing (CEP) module 260 can collect both metrics 242 and results from the artificial intelligence engine 250 to process the flow of data and detect and identify potential faults. For example, for fault patterns that have been identified previously, if an element (i.e., a metric or an event) has been matched, then all the metrics and events that belong to the same cluster of the detected metric or event may be placed on alert. A match for a metric may be based on a value of the metric falling within a derivation range. Based on the strong correlation, any abnormal activity to a metric or an event in a cluster may indicate a fault with a high probability. Thus, the complex event processing module refers to an engine designed to process large amount of continuous flow of data and correlating occurrences for identifying patterns in the data.

In some embodiments, MTTR may be calculated as ((total maintenance time)/(total number of repairs)), and generation of a priority P1 categorization would be based on both the relative priority of the fault, as well as a severity assessment of the incident. This type of measurement would provide a metric to grade the efficiency of the automated or semi-automated remediation system. A metric of false positives and false negatives over a particular duration for a particular number of components can help to define the grading of this system. Similarly, the MTBF, representing availability and reliability may be calculated as ((total uptime)/(total number of failures)). The MTTF may be calculated by ((total hours of operation)/(total units)). Failure rate (also referred to as lambda, or $L_1$ etc.) is the inverse of MTBF or MTTF (i.e., 1/MTBF or 1/MTTF). The Reliability & Availability Score for the entire network in series systems is ($L_1+L_2 \ldots +L_n$), and for parallel systems ($1/L_1+1/L_2+ \ldots +1/L_n$). Some or all of these metrics can be provided to the CEP module 260 to trigger retraining of the model, trigger automated remediation actions, or alert operations (see below).

Furthermore, the metrics 242 and other data stored by repository 230 may be processed, analyzed and displayed via a tool and/or user interface. The tool and/or user interface may allow and/or provide for a system administrator to query and alert on metrics (notifications 280) and create a managed dashboard (Robotic Process Automation (RPA)

dashboard engine 270) to visually display the data and metrics (also referred to herein as a maintenance dashboard). In some embodiments, the data is analyzed and visually displayed using an open source software platform to allow an administrator or other support end-users (see operations 204) to query and generate alerts and notifications 280 on specific metrics and to create dashboards to visually display time series data. The reports may be chart reports, dashboards, or other reports. An example of an open source software platform for time series analytics and visualization is Grafana, which is provided by GrafanaLabs. Other dashboards such as Guidewire, JSON, Llamasoft, Domo, and Tableau, or others known in the art may be implemented. In some embodiments, the analytics and visualization platform is hosted in the cloud, while in other embodiments the analytics and visualization platform is hosted locally on a server. The use of RPA dashboard engine 270 provides a no-code automation process that is simple and effective. Robotic automation interacts with the existing architecture with no complex system integration required, and is used to automate workflow, infrastructure, and back office processes which are labor intensive, and emulates human execution of the repetitive processes using various application and systems. The dashboards may provide operators with user interfaces by which they can interact with the data.

An "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

The errors, once detected, can be classified via an Actions Catalogue 290. The Actions Catalogue 290 can be configured to classify errors into two segments or clusters based on the events registered in the logs, including (a) Fully Automated Operations, and (b) Semi-Automated Operations. Fully Automated Operations refer to a fault classification in which the operations are designed to be fully unattended, such that the entire chain of events has zero human intervention and will be discussed in further detail with reference to FIG. 4. Semi-Automated Operations, discussed below with reference to FIG. 5 below, refer to a fault classification in which the operations are not designed to be fully unattended, such that the corresponding chain of events is intended to involve human intervention in confirming the faults and/or executing the resolution process (which can be automatic or human controlled).

As an example, an analytics stack with components similar to those described in FIG. 2 may be contemplated. The analytics stack can collect information from a set of data sources. This information is transformed to a new format and pushed to the front streaming queue, for example, via ETL (Extract, transform, and load) tools pulling data from source systems and pushing to a front streaming queue. The streaming queue in this example may refer to the AWS (Amazon Web Services™) Kinesis infrastructure or other infrastructure. Consumers (such as code components using Java Virtual Machine (JVM)-based deployment) are added to the queue. The analytics stack also includes a clustered MySQL database, a tableau dashboard for visualization, and a plurality of jobs performing a set of aggregation, composition, and other analytics on the incoming data. Each of these applications or components will be associated with a standard "logging", including a timestamp field. In addition, each event or action for each point is recorded and stored in the knowledge repository.

The artificial intelligence engine or Tensor model can detect that event queue traffic is increasing based on the queue length per each $T_1 \ldots T_n$ timestamp. In response, the artificial intelligence engine predicts the queue size and dependent key performance indicators (KPIs) for time $T_n \ldots T_{n+1}$. The MTTF/MTBF-based scoring unit calculates the dependent systems failure and whole analytics units to failure. The CEP module obtains the input from the MTTF/MTBF scoring unit, as well as the artificial intelligence engine and stack metadata to determine a corrective action. For example, the CEP module can be configured to determine the cause and effect, and in response triggers an action to auto-scale (where scaling factor as $S_1$) consumers to accelerate the queue process. In this case, scale is calculated as $(S_{1*n})$–(the aggregation job), where n is the factor to be calculated, based on a total maximum that the system can scale, time of the operation, and budget constraints for a specific deployment. An alert can be conveyed to the Operations team for further monitoring and governance process.

Figure 3:
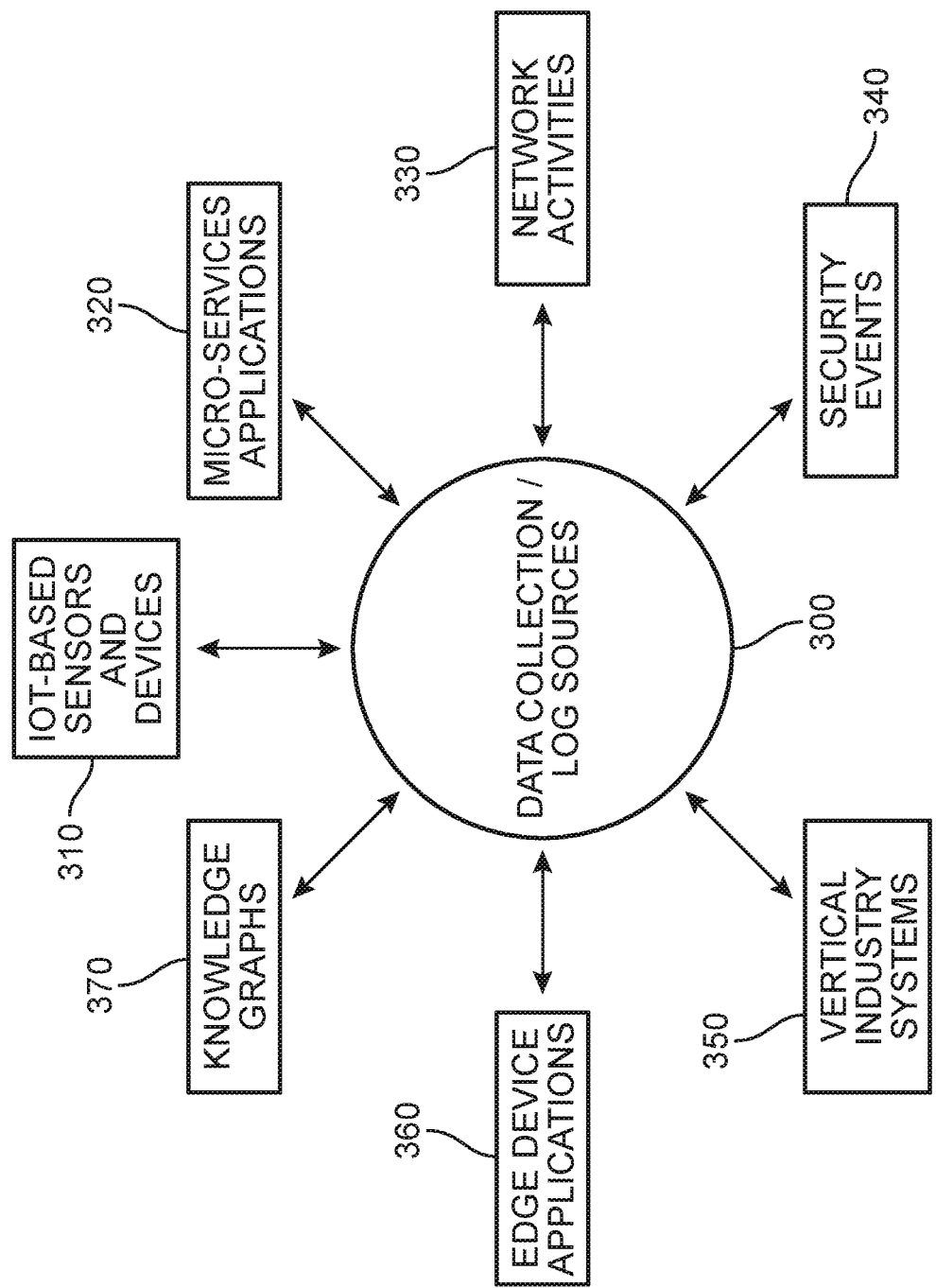
FIG. 3 is a schematic diagram of an embodiment of sources for data in the fault detection and remediation system.

As noted earlier, the learning module 220 can harvest log and event data from a wide variety of sources and components. This collection can occur in real-time or near-real-time, and/or at regular intervals and pre-define periods of time. For purposes of example, some of these sources 300 are illustrated in FIG. 3. A first source 310 can include Internet-of-Things (IOT) based ready-made use cases which can generate high volume and high velocity sensor and device logs, which must be monitored and analyzed and remediated in near-real-time. A second source 320 includes the offered micro-services application software, each of which can include its own logging system, as well as its own audit and error and transaction logs. In addition, a third source 330 includes network logs for different activities in the network realm, and a fourth source 340 includes security tool logs generated for each of the events. A fifth source 350 includes vertical industry systems (chain of services specific to an industry problem) that can generate their own logs, and a sixth source 360 includes data created by applications running in edge devices.

Furthermore, in some embodiments, knowledge graphs generated from other related data sources may serve as a seventh source 370. A knowledge graph may serve as a representation that captures the salient knowledge about a particular task. The general intent or task associated with previous conversations between a customer and an agent can be determined and used to separate different groups or collections of conversations. A group of "nodes" in the graph can be extracted that each represent various utterances associated with the same or similar intents. In other words, a node will represent similar utterances (e.g., utterances directed toward the same resolution and/or providing similar information) by different agent instances or customers across different conversations. Based on these classifications, the system can be configured to generate and present a knowledge graph comprising a plurality of these nodes. In addition, the nodes will be connected to other nodes by an "edge" line, also referred to herein as a transitional path or transitional edge. For example, a first node will be connected to a second node by a transitional path. The transitional path represents one or more instances where a particular utterance associated with the first node was followed by a particular utterance associated with the second node in a conversation, thereby depicting a dialogue sequence corresponding to a portion of the conversation. Thus, the knowledge graphs can convey in a single illustration a large collection of utterances from a set of conversations about a similar topic as well as the subsequent utterances that were provided in the conversation sequence, as well as the frequency with which such sequences occurred. Thus, a knowledge graph may be understood to refer to a living graph that acquires and integrates information into an ontology and applies a reasoner to derive new knowledge.

Knowledge graphs present connections (relationships) in the data, and allows for the ready transfer of new data items as they are added into the data pool. In addition, the meaning of the data is encoded alongside the data in the graph, in the form of the ontology. Because the underlying basis of a knowledge graph is the ontology, specifying the semantics of the data, the knowledge graph further allows implicit information to be derived from explicitly asserted data that would otherwise be hard to discover. For example, classifications and other data obtained during end-user or administrator interactions can be used to create nodes and assign word sequences to a node in a conversation graph as well as form corresponding transitional paths. Generally, a conversation graph can be understood to represent a plurality of conversations that have occurred and were directed to a particular task, intent, goal, and/or objective. The information provided by a knowledge graph can be used by the artificial intelligence engine to both detect potential faults, as well as determine the preferred course of remediation.

By collecting data from multiple sources as described herein, a framework can be provided by which the architecture can automatically 'sense' and detect potential system failures as well as make robust predictions for the MTTF and MTBF, allowing the platform to take appropriate and timely corrective actions. In some embodiments, a reliability score for the involved chain of services can also be created. For example, each data source can be associated with a confidence value used to score the reliability of the data sources. For example, multiple data sources may include information for a particular field describing a system condition or parameter. In cases of conflict, the confidence value is used to determine which data source is more reliable for a given field. Alternatively, multiple data sources may be equally reliable and therefore have the same confidence value. It should be apparent to one of ordinary skill in the art, that various ways of tracking the reliability of a data source are contemplated herein.

Figure 4:
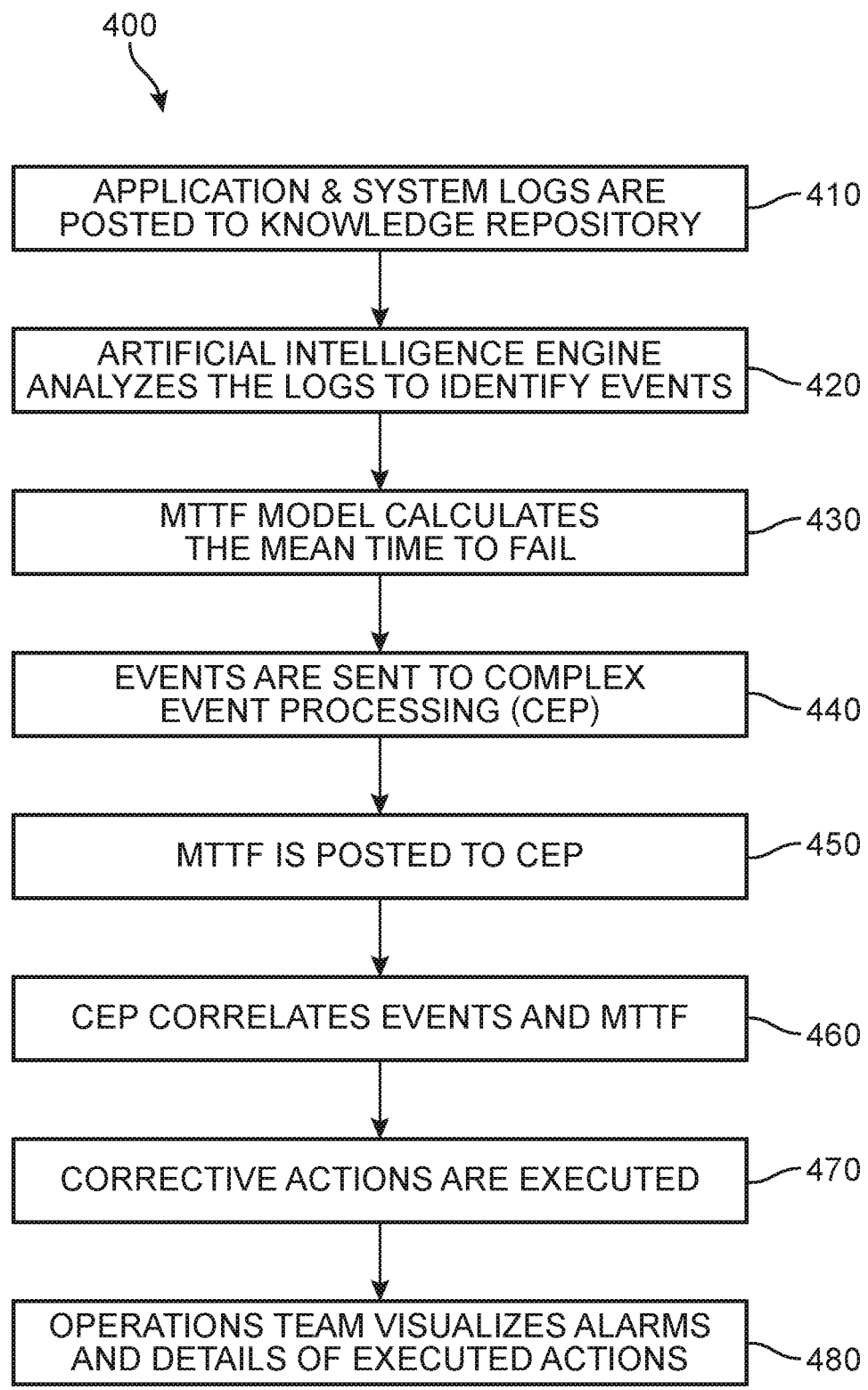
FIG. 4 is a schematic flow diagram of an automated process for a fault detection and remediation, according to an embodiment.
Figure 5:
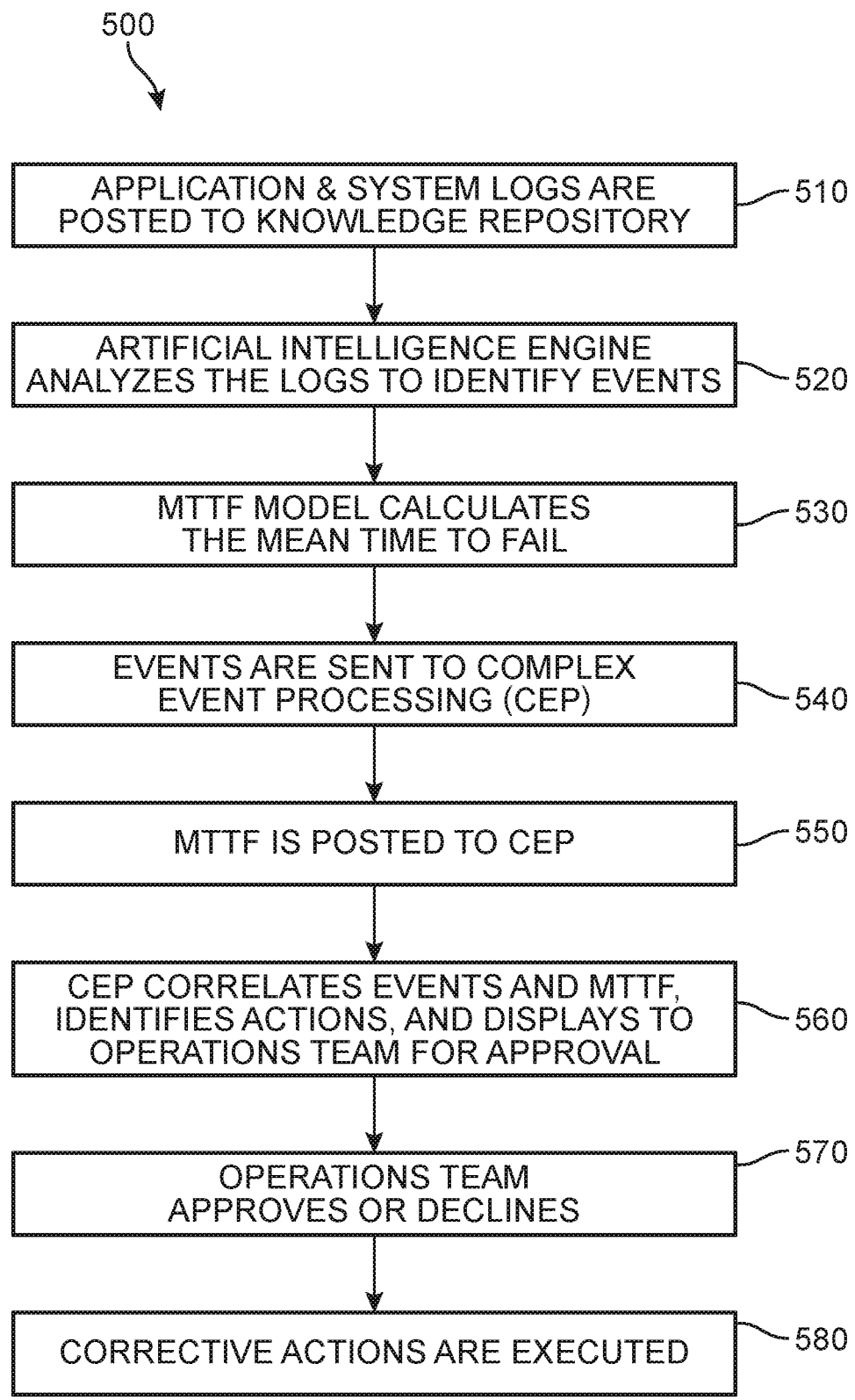
FIG. 5 is a schematic flow diagram of a semi-automated process for a fault detection and remediation, according to an embodiment.

Referring now to FIGS. 4 and 5, two examples of an event flow using architecture 200 of FIG. 2 are discussed. In FIG. 4, an automated process 400 is shown in which the fault detection and remediation processes will occur in a wholly automatic manner. During a first stage 410, all logs, generated from some or all data sources connected to the platform, such as applications, tools, devices, etc. are automatically harvested and collected and posted to the knowledge repository. This process results in the transformation of raw logs as a source of truth to enriched and clean logs manifested by different kinds of data models. A bifurcated process can then occur via a second stage 420 and a third stage 430, which may be performed concurrently and automatically. In second stage 420, the artificial intelligence engine (e.g., tensor flow-based models) will be implemented to automatically identify fault and events (i.e., event detection+anomaly recognition), while third stage 430 automatically applies custom or known MTBF and MTTF models to calculate the mean time between failures or the mean time to failure. The third stage 430 would also automatically calculate the reliability score of the series of computing sources for the logs (e.g., precision plays, chain of microservices, etc.).

These processed events and metrics are then shared automatically with the complex event processing (CEP) module in a fourth stage 440 and a fifth stage 450, respectively. The CEP module can automatically correlate the events and metrics based on an intelligent model in a sixth stage 460, as well as identify any appropriate corrective actions and execution time of actions in a seventh stage 470. The corrective actions will also be automatically executed. Finally, in an eighth stage 480, the corresponding notifications for these events and actions and/or raised or fixed alarms can be automatically presented to and monitored by an operations team, for example via a central dashboard.

In some embodiments, the proposed architecture can be configured to operate with some but not complete automation. An example of such a semi-automated process 500 is presented in FIG. 5. In this case, a first stage 510 occurs when all logs, generated from some or all data sources connected to the platform, such as applications, tools, devices, etc. are automatically harvested and collected and posted to the knowledge repository. This process results in the transformation of raw logs as a source of truth to enriched and clean logs manifested by different kinds of data models. A bifurcated process can then occur via a second stage 520 and a third stage 530, which may be performed concurrently and automatically. In second stage 520, the artificial intelligence engine (e.g., tensor flow-based models) will be implemented to automatically identify fault and events (i.e., event detection+anomaly recognition), while third stage 530 automatically applies custom or known MTBF and MTTF models to calculate the mean time between failures or the mean time to failure. The third stage 530 would also automatically calculate the reliability score of the series of computing sources for the logs (e.g., precision plays, chain of microservices, etc.).

These processed events and metrics are then shared automatically with the complex event processing (CEP) module in a fourth stage 540 and a fifth stage 550, respectively. The CEP module can automatically correlate the events and metrics based on an intelligent model in a sixth stage 560, as well as identify any appropriate corrective actions and execution time of actions. At this time, the process diverges from the process presented in FIG. 4. During the sixth stage 560, the identified actions and events are automatically transmitted to and displayed to an operations team. Thus, the CEP module can be understood to perform prescriptive analytics, where the results of these analytics are provided to the SME (subject matter expert) of the operations team assigned to monitor the system. Thus, rather than automatically executing any corrective actions, the operations team will be responsible for reviewing and approving/confirming (or declining) the recommended actions in a seventh stage 470. The corrective actions will thus be pending execution until approved by an operator (or referred to another SME). This can be especially useful in situations in which the corrective actions may affect specific aspects of platform performance and/or human users wish to be alerted and maintain more control over and awareness of the system responses.

In order for corrective actions to remain effective and/or to be appropriately identified, the artificial intelligence engine can engage in a continuous or substantially continuous training cycle. For example, a plurality of models may be trained to predict the occurrence of the fail condition(s) for the system. The predictive model that may be used to forecast a probability of an outcome can include, for example, a decision tree model, a neural network model, a logistic regression model, etc. The models may be trained using a training set from the extracted performance metrics. Training, for instance, refers to implementing the training set to fit (e.g. variable selection and parameter estimation) a model that is used to predict a target variable from one or more predictor variables. Each of the plurality of trained models may then be validated using a validation set from the extracted performance metrics. According to an example, each of the validated models may be rated according to predefined criteria to select the "best" model. The predefined criteria may include, but is not limited to, considerations of the predictive accuracy of each of the validated models, the interpretability of an output of each of the validated models, the efficiency of each of the validated models, the stability and robustness of each of the validated models, the scalability of each of the validated models, and the lift of each of the validated models.

For example, a highest rated model (e.g., a "best model") may be selected to predict the occurrence of a fail condition. The predictive results of the selected model (e.g., the likelihood of the fail condition) may be used to prioritize a maintenance or response schedule. As an example, the selected model may predict the occurrence of the fail condition at least 48 hours prior to the actual fail condition so that an operations team may proactively fix the issue. The examples may predict which components are likely to fail and address them based on priority. Accordingly, in some embodiments, the model may provide operators with an understanding of the future failure patterns (also referred to herein as "fault occurrence pattern") of the system and a likely load from certain customer groups or regions. By understanding these future failure patterns, network providers are better able to reduce the cost of maintenance, improve the customer experience, and improve the life time of the system in the network infrastructure.

It can be appreciated that the relationship between failure and the reasons for failure can change with time and may lead to a decay of accuracy of predictive model. The examples disclosed herein address the decay of accuracy of the predictive model by continually training/re-training and validating the predictive model using current data and information that is captured from thousands of different sources in approximately real-time. For example, a predictive analytics server may aggregate performance metrics to create a performance analytic record (PAR). For example, the created PAR may be a dataset that includes all the necessary performance metrics to be input into a predictive model that is trained to forecast an occurrence of a fail condition.

In different embodiments, performance metrics may be aggregated from a plurality of data sources such as component telemetry data, customer information, customer surveys, interactive voice response (IVR) call information, work orders (e.g., field technician data), and billing information. Thus, the performance of the trained predictive models may be compared on the training set and the validation set. If the performance of a trained predictive model does not deteriorate on the validation set as compared to training set, then the trained predictive model may be considered stable. If the trained predictive model is validated, the validated predictive model may be in consideration to be selected as the "best" predictive model to predict the fail condition. The artificial intelligence engine may be configured to rate each of the validated models according to predefined criteria. The predefined criteria may include at least one of a predictive accuracy of the validated model, an interpretability of output for the validated model, an efficiency of the validated model, a stability and robustness of the validated model, a scalability of the validated model, and a lift of the validated model. If the trained predictive model is not validated, then the system may retrain the predictive model on another partitioned training set.

Figure 6:
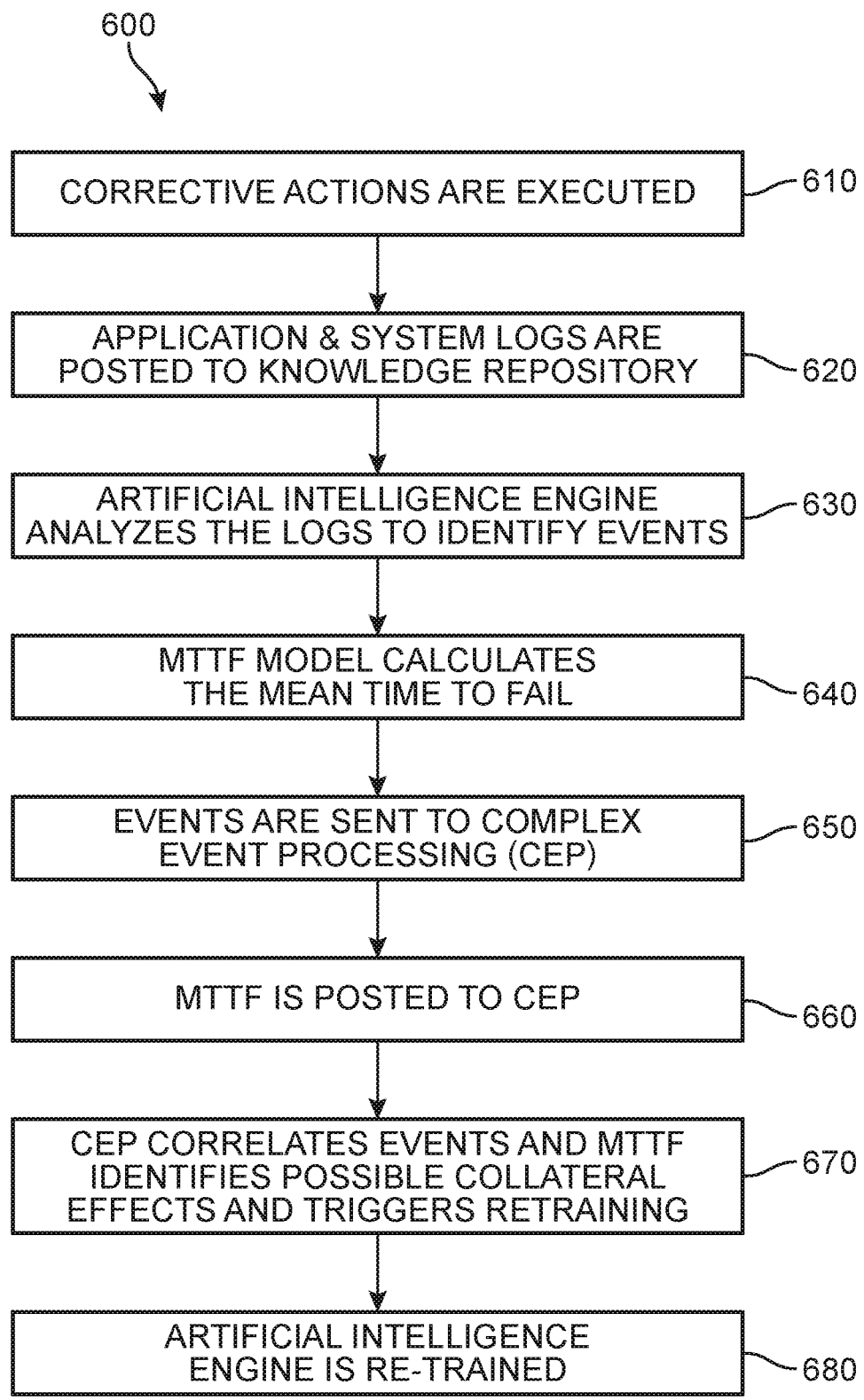
FIG. 6 is a schematic diagram of a high-level flow of re-training an artificial intelligence engine, according to an embodiment.

FIG. 6 presents one non-limiting example of the re-training process 600. In this case, a first stage 610 occurs once one or more corrective actions (for example, following automated process 400 or semi-automated process 500 of FIGS. 4 and 5 are undertaken) are identified and executed in a first stage 610. This information, as well as new data, generated from some or all data sources connected to the platform, such as applications, tools, devices, etc. are automatically harvested and collected and posted to the knowledge repository in a second stage 620. This process results in the transformation of raw logs as a source of truth to enriched and clean logs manifested by different kinds of data models. A bifurcated process can then occur via a third stage 630 and a fourth stage 640, which may be performed concurrently and automatically. In third stage 630, the artificial intelligence engine (e.g., tensor flow-based models) will be implemented to automatically identify fault and events (i.e., event detection+anomaly recognition), while fourth stage 640 automatically applies custom or known MTBF and MTTF models to calculate the mean time between failures or the mean time to failure. The fourth stage 640 would also automatically calculate the reliability score of the series of computing sources for the logs (e.g., precision plays, chain of microservices, etc.).

These processed events and metrics are then shared automatically with the complex event processing (CEP) module in a fifth stage 650 and a sixth stage 660, respectively. The CEP module can automatically correlate the events and metrics based on an intelligent model in a seventh stage 670, as well as identify any appropriate corrective actions and execution time of actions. In addition, the CEP module automatically identifies possible collateral effects and triggers a re-training for the specific fail condition. During the eighth stage 680, the artificial intelligence engine is re-trained. Co-relationships between different streams of data can be used to identify missing events and erroneous data, and/or provide be a temporal chain of events for a known failure.

For purposes of clarity, two examples are provided below. As a first example, the occurrence of a first event (E1) might cause a first fault (F1), which results in an identification of a first resolution/remediation (R1) generated by an embodiment of the decision tree-based model. However, R1 inadvertently causes another, second event (E2) which causes a second fault (F2); in other words, a side effect of the execution of R1 is F2. The F2 will be resolved by a second resolution (R2). Thus, such a response matrix may continue to occur until an "$R_n$" is applied and the system stabilizes. The re-training process described above would incorporate this pattern, such that if and when E1 occurs again, the subsequent chain of events and resolutions to be applied are known and can be automatically implemented.

As a more concrete example, if E1 is an event in which high CPU and memory utilization is detected for a chain of hosts, raising an F1 and a corresponding R1 in which the instance type is changed and a reboot is initiated. This is followed by E2 occurring in the same environment, whereby an Application A is down due to F2. In response, R2 is applied in which the application is rebooted. This chain of resolution (E1, F1, R1→E2, F2, R2) becomes a learned fault occurrence pattern for subsequent errors of the same nature.

A second example incorporates a prioritization model or feature. In this example, if E1 causes F1, the F1 may be categorized as a lower, second priority (P2), while F2 caused by E2 is categorized as a relatively lower, third priority (P3). The same chain continues for time $t_1$ to $t_n$. In this case, the continuous co-relation artificial intelligence engine determines that E2, E3, . . . $E_n$ can collectively cause a fault $F_n$ which can be categorized as a highest first priority (P1). Thus, the chain of resolutions ($R_1$ . . . $R_n$) can actually solve a fault $F_n$ marked as P1 caused by Event $E_n$ in the chain ($E_1+E_2$ . . . $+E_n$). In some embodiments, subsequent instances of this fault occurrence pattern can address P1 by a reversed resolution of the events.

To provide greater clarification regarding these types of processes, a real-world example can be described. In this example, a fictitious client of a collection of pre-built, modular services and capabilities has an environment with the following computing elements in a cloud environment: (a) a Tensor Flow Event Detection and Prediction Module; (b) a Tensor Flow model configured to identify anomalies in the server data based on provided schema; (c) a Skew detection module for comparing training and server data; (d) a Drift detection module for monitoring series of data; and (e) an MTTF/MTBF module.

Figure 7:
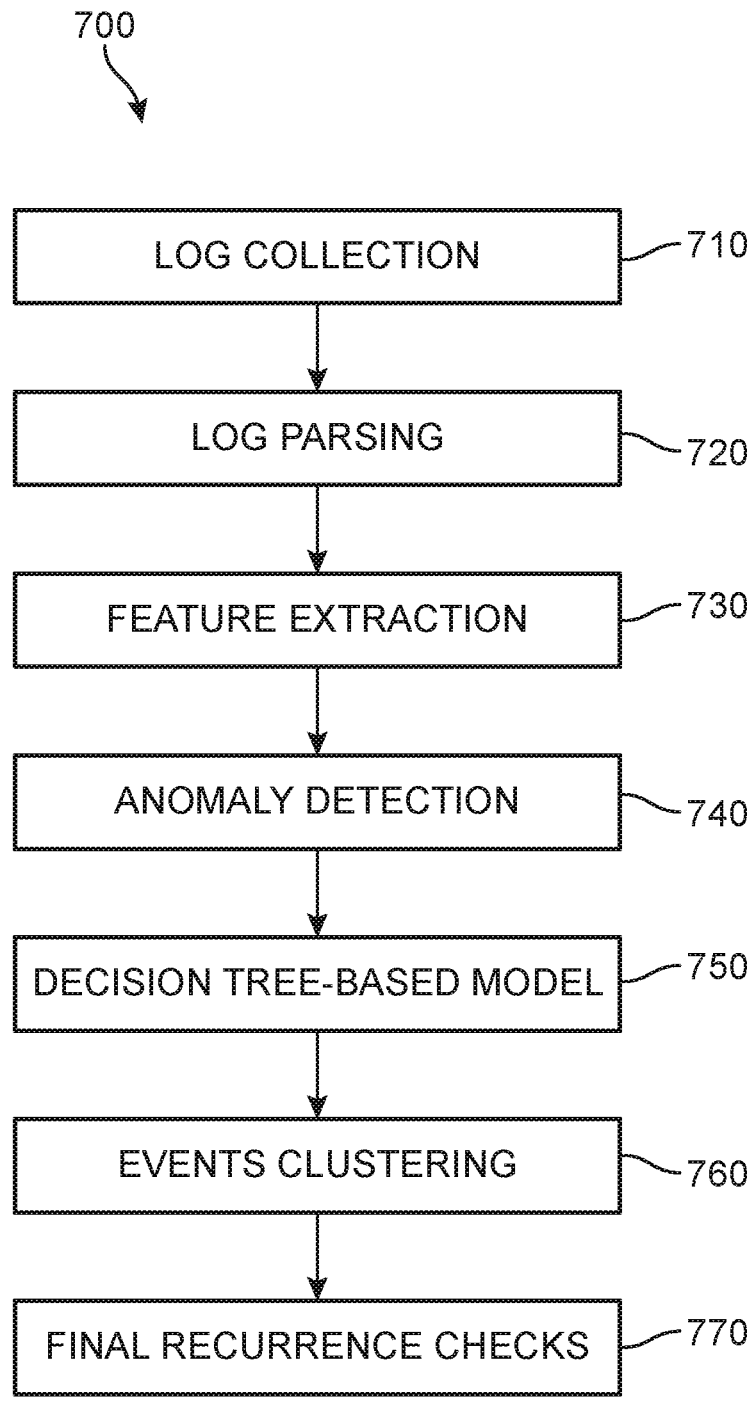
FIG. 7 is a flow diagram of process of providing a fault detection framework, according to an embodiment.

Referring to FIG. 7, the Tensor Flow or other model can implement a process 700 to provide the desired fault detection framework. In some embodiments, the Tensor Flow or other model can collect logs and other data centrally in the platform in a first step 710. These logs are parsed to obtain a map of structured events in a second step 720. Based on this map, the logs may be sliced into short sequences through interval windows, such as a sliding window or session window. Feature extraction can then be performed to vectorize the log sequence in a third step 730. Each feature vector will be reviewed to determine whether an anomaly is present in a fourth step 740, for example via the skew detection module which detects any exceptions as anomalies.

Furthermore, a Decision Tree-Based Model can be trained in a fifth step 750 to classify the failed and successful requests that occurred during an ongoing error condition. The paths that lead to failure-predicting nodes are identified and relevant components are extracted. These represent the most competitive classifiers in terms of prediction, and offer the advantage of yielding human-interpretable results that can be reviewed by an operations team and real time SME. A sixth step 760 includes Events Clustering, whereby events are classified with their transition identifier, time, and tenant identifier. When a series of events (e.g., $E_1, E_2 \ldots E_n$) are logged for a single transaction, log vectorization is performed and the feature vectors are extracted. Clustering based on the sequence of events and the extracted feature vectors can then be performed. In some embodiments, events can be given weights based on IDF (Inverse Document Frequency). Following this weight calculation, each log sequence can be represented as vector of weight in an N-Dimensional space. For example, if a fault occurrence pattern includes 10 different events in the log, this can be represented by a 10-dimensional vector. In a seventh step 770, Final Recurrence Checks are performed, whereby recurrent set of events leading to a failure for which there are known solutions are identified, and in cases in which the fault occurrence pattern has not occurred previously, a manual inspection may be performed, with the selected resolution being added to the knowledge base for future use.

For purposes of illustration, some examples of the log data structure used by the artificial intelligence engine to verify system availability and predict faults are presented with reference to FIGS. 8A-8D. Each of the tables (a first table 810, second table 820, third table 830, and fourth table 840) include a listing of key fields with corresponding descriptions, types, and notes that may represent a sample of the record layout generated by the platform generates, and used by the artificial intelligence engine to determine system status, identify system health, and predict faults. The MTTF model can learn and apply the logic on some or all of the listed fields. For example, fields "httpResponseCode", "ApplicativeErrorCode", and "ServiceResponseDescription" (see FIGS. 8C and 8D) can be used to verify the status of the application errors in a specific time and determine if there is a fault in progress caused by unavailability of a specific platform component, identify which functionalities of the system are causing the fault, as well as identify which actions and commands need to be executed to mitigate or resolve the fault. In addition, the field "RequestDurationInMsec" (see FIG. 8D) can be used to monitor the condition based on a time frame (e.g., over the last minute or last hour) and compare it with previous day's same timeframe and incoming request duration per component. For example, this field can reflect whether there is a service response time degradation, how it will impact the service in the near-future, and/or identify which component(s) can potentially cause a violation of the platform SLA or another fault if no actions is taken, as well as apply the needed actions to avoid said fault or SLA violations. Similarly, "ServiceName" (see FIG. 8B) can be used to monitor the condition based on a time frame (e.g., over last minute or last hour) and compare it with previous day's same timeframe and incoming number of requests per component. For example, this field can reflect the number of incoming requests, whether the amount of incoming requests is expected or anomalous, which component is associated with unexpected incoming traffic, and the impact of incoming requests per component response time, as well as apply needed actions to avoid faults and SLA violations.

Figure 9:
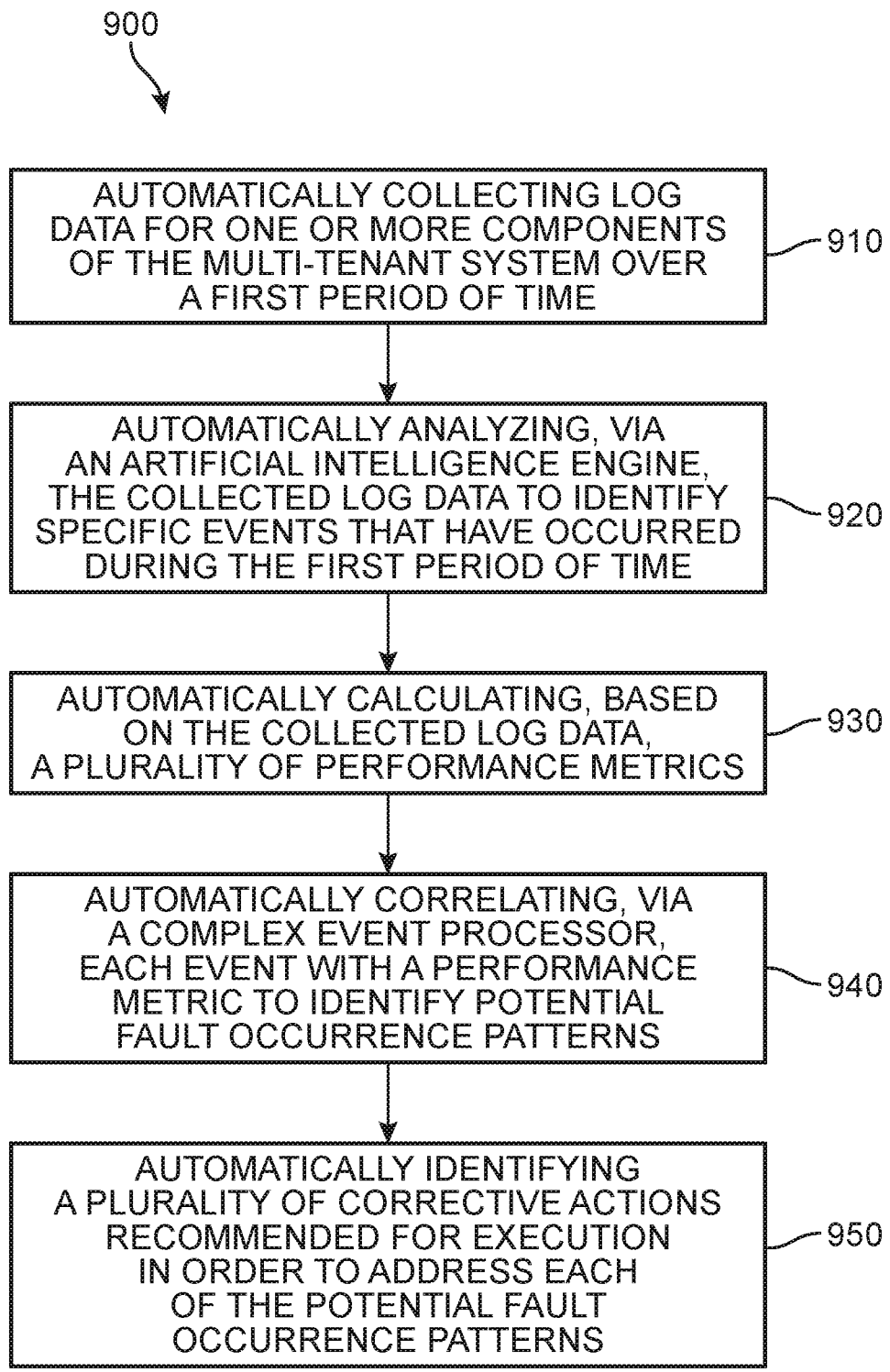
FIG. 9 is a flow chart depicting a method of automating fault prediction and response for a multi-tenant system, according to an embodiment.

FIG. 9 is a flow chart illustrating an embodiment of a method 900 of automating fault prediction and response for a multi-tenant system. As shown in FIG. 9, a first step 910 of the method 900 includes automatically collecting log data for one or more components of the multi-tenant system over a first period of time, and a second step 920 of automatically analyzing, via an artificial intelligence engine, the collected log data to identify specific events that have occurred during the first period of time. The method 900 further includes a third step 930 of automatically calculating, based on the collected log data, a plurality of performance metrics, and a fourth step 940 of automatically correlating, via a complex event processor, each event with a performance metric to identify potential fault occurrence patterns. In addition, a fifth step 950 includes automatically identifying a plurality of corrective actions recommended for execution in order to address each of the potential fault occurrence patterns.

In other embodiments, the method may include additional steps or aspects. For example, the method can further include storing the collected log data in an electronic repository and/or training the artificial intelligence engine based on past fault occurrence patterns that have occurred. In one example, the plurality of performance metrics includes a first performance metric corresponding to a Mean Time To Failure (MTTF) value, while in another example, the plurality of performance metrics includes a first performance metric corresponding to a Mean Time Between Failure (MTBF) value. In some embodiments, the method also includes a step of automatically executing some or all of the plurality of corrective actions. In another embodiment, the method also includes automatically causing a maintenance dashboard to present one or more notifications regarding the potential fault occurrence patterns and corresponding corrective actions. In some embodiments, the method also includes steps of receiving, from the maintenance dashboard, approval to execute one or more of the corrective actions, and then executing, in response to receiving the approval, the one or more approved corrective actions. In another example, the method can also include automatically determining, based on the plurality of performance metrics and correlated events, a priority queue in which potential fault occurrence patterns are categorized in order of an estimated time to failure and a severity assessment of the failure. In some embodiments, the method also includes automatically executing the plurality of corrective actions in a response order corresponding to the priority queue.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service.

The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment 222, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of automating fault prediction and response for a multi-tenant system, the method comprising:
aggregating, via a predictive analytics server, performance metrics from one or more data sources including component telemetry data, customer information, customer surveys, interactive voice response call information, work orders, and billing information;
extracting a training set from the performance metrics;
feeding the training set to each of a plurality of artificial intelligence (AI) models configured to predict an occurrence of a first fail condition in the system, each AI model based on a different set of predictor variables;
rating, via an artificial intelligent engine, each AI model of the plurality of AI models according to predefined criteria including one or more of a predictive accuracy of the AI model, interpretability of an output of the AI model, scalability of the AI model, and lift of the AI model to identify a highest-rated first AI model;
collecting, at a cloud-based repository, log data for one or more components of the multi-tenant system over a first period of time;
analyzing, via the first model, the collected log data to predict an occurrence of the first fail condition; and
implementing a first corrective action to proactively remedy the first fail condition.

2. The method of claim 1, further comprising:
determining, at the complex event processor, the first corrective action caused an occurrence of a second fail condition; and
identifying and executing a second corrective action for the second fail condition.

3. The method of claim 1, further comprising training the artificial intelligent engine based on past fault occurrence patterns.

4. The method of claim 1, further comprising calculating a first performance metric corresponding to a Mean Time To Failure (MTTF) value in order to identify potential fault occurrence patterns.

5. The method of claim 1, further comprising calculating a first performance metric corresponding to a Mean Time Between Failure (MTBF) value in order to identify potential fault occurrence patterns.

6. The method of claim 2, further comprising re-training the artificial intelligent engine in response to the occurrence of the second fail condition, the re-training based on a chain of events including the first anomalous event, the first corrective action, the second fail condition, and the second corrective action.

7. The method of claim 2, further comprising automatically causing a maintenance dashboard to present one or more notifications regarding the second fail condition and corresponding second corrective action.

8. The method of claim 7, further comprising:
receiving, from the maintenance dashboard, approval to execute the second corrective action; and
executing, in response to receiving the approval, the second corrective action.

9. The method of claim 1, further comprising automatically determining, based on a plurality of performance metrics and correlated events, a priority queue in which potential fault occurrence patterns are categorized in order of an estimated time to failure and a severity assessment of the failure.

10. The method of claim 9, further comprising automatically executing the plurality of corrective actions in a response order corresponding to the priority queue.

11. A system of automating fault prediction and response for a multi-tenant system, the system comprising:
a processor;
machine-readable media including instructions which, when executed by the processor, cause the processor to:
aggregate, via a predictive analytics server, performance metrics from one or more data sources including component telemetry data, customer information, customer surveys, interactive voice response call information, work orders, and billing information;
extract a training set from the performance metrics;
feed the training set to each of a plurality of artificial intelligence (AI) models configured to predict an occurrence of a first fail condition in the system, each AI model based on a different set of predictor variables;
rate, via an artificial intelligent engine, each AI model of the plurality of AI models according to predefined criteria including one or more of a predictive accuracy of the AI model, interpretability of an output of the AI model, scalability of the AI model, and lift of the AI model to identify a highest-rated first AI model;
collect, at a cloud-based repository, log data for one or more components of the multi-tenant system over a first period of time;
analyze, via the first model, the collected log data to predict an occurrence of the first fail condition; and
implement a first corrective action to proactively remedy the first fail condition.

12. The system of claim 11, wherein the instructions further cause the processor to:
determine, at the complex event processor, the first corrective action caused an occurrence of a second fail condition; and
identify and execute a second corrective action for the second fail condition.

13. The system of claim 11, wherein the instructions further cause the processor to train the artificial intelligent engine based on past fault occurrence patterns.

14. The system of claim 11, wherein the instructions further cause the processor to calculate a first performance metric corresponding to a Mean Time To Failure (MTTF) value in order to identify potential fault occurrence patterns.

15. The system of claim 11, wherein the instructions further cause the processor to calculate a first performance metric corresponding to a Mean Time Between Failure (MTBF) value.

16. The system of claim 12, wherein the instructions further cause the processor to re-train the artificial intelligent engine in response to the occurrence of the second fail condition, the re-training based on a chain of events including the first anomalous event, the first corrective action, the second fail condition, and the second corrective action.

17. The system of claim 12, wherein the instructions further cause the processor to automatically cause a maintenance dashboard to present one or more notifications regarding the second fail condition and corresponding second corrective action.

18. The system of claim 17, wherein the instructions further cause the processor to:
receive, from the maintenance dashboard, approval to execute the second corrective action; and
execute, in response to receiving the approval, the second corrective action.

19. The system of claim 11, wherein the instructions further cause the processor to automatically determine, based on a plurality of performance metrics and correlated events, a priority queue in which potential fault occurrence patterns are categorized in order of an estimated time to failure and a severity assessment of the failure.

20. A system comprising one or more computers and one or more storage devices storing instructions that are operable, when executed by the one or more computers, to cause the one or more computers to:
aggregate, via a predictive analytics server, performance metrics from one or more data sources including component telemetry data, customer information, customer surveys, interactive voice response call information, work orders, and billing information;
extract a training set from the performance metrics;
feed the training set to each of a plurality of artificial intelligence (AI) models configured to predict an occurrence of a first fail condition in the system, each AI model based on a different set of predictor variables;
rate, via an artificial intelligent engine, each AI model of the plurality of AI models according to predefined criteria including one or more of a predictive accuracy of the AI model, interpretability of an output of the AI model, scalability of the AI model, and lift of the AI model to identify a highest-rated first AI model;
collect, at a cloud-based repository, log data for one or more components of the multi-tenant system over a first period of time;
analyze, via the first model, the collected log data to predict an occurrence of the first fail condition; and
implement a first corrective action to proactively remedy the first fail condition.

* * * * *